US006438368B1

United States Patent
Phillips et al.

(10) Patent No.: US 6,438,368 B1
(45) Date of Patent: Aug. 20, 2002

(54) INFORMATION DISTRIBUTION SYSTEM AND METHOD

(75) Inventors: Robert C. Phillips, Northbrook; Caitlin B. Bestler, Lisle, both of IL (US)

(73) Assignee: Ikadega, Inc., Northbrook, IL (US)

( * ) Notice: Subject to any disclaimer, the term of this patent is extended or adjusted under 35 U.S.C. 154(b) by 0 days.

(21) Appl. No.: 09/579,574

(22) Filed: May 26, 2000

Related U.S. Application Data

(60) Provisional application No. 60/193,729, filed on Mar. 30, 2000.

(51) Int. Cl.[7] .............................................. H04M 11/10
(52) U.S. Cl. ...................... 455/412; 455/414; 455/417; 370/300; 370/409; 370/428; 370/397; 725/92
(58) Field of Search .................................. 455/412, 414, 455/417, 3.04, 3.01; 340/539; 342/457; 370/300, 409, 338, 428, 397, 396; 725/91, 92, 93, 94

(56) References Cited

U.S. PATENT DOCUMENTS

| | | | |
|---|---|---|---|
| 4,780,757 A | | 10/1988 | Bryer et al. |
| 5,414,455 A | * | 5/1995 | Hooper et al. ............... 348/7 |
| 5,442,390 A | | 8/1995 | Hooper et al. |
| 5,446,877 A | | 8/1995 | Liu et al. |
| 5,453,779 A | | 9/1995 | Dan et al. |
| 5,461,415 A | | 10/1995 | Wolf et al. |
| 5,481,542 A | | 1/1996 | Logston et al. |
| 5,528,513 A | | 6/1996 | Vaitzblit et al. |
| 5,544,161 A | | 8/1996 | Bigham et al. |
| 5,544,334 A | | 8/1996 | Noll |
| 5,581,715 A | | 12/1996 | Verinsky et al. |
| 5,581,716 A | | 12/1996 | Park |
| 5,594,924 A | | 1/1997 | Ottesen et al. |
| 5,724,543 A | | 3/1998 | Ozden et al. |
| 5,751,883 A | | 5/1998 | Ottesen et al. |
| 5,761,417 A | | 6/1998 | Henley et al. |
| 5,778,186 A | | 7/1998 | Funaya |
| 5,778,252 A | | 7/1998 | Sangveraphunsiri et al. |
| 5,787,482 A | | 7/1998 | Chen et al. |
| 5,805,921 A | | 9/1998 | Kikinis et al. |
| 5,815,662 A | | 9/1998 | Ong |
| 5,826,110 A | | 10/1998 | Ozden et al. |
| 5,838,362 A | | 11/1998 | Furuya et al. |
| 5,845,279 A | | 12/1998 | Garofalakis et al. |
| 5,867,155 A | | 2/1999 | Williams |
| 5,870,551 A | | 2/1999 | Ozden et al. |
| 5,890,203 A | | 3/1999 | Aoki |
| 5,920,709 A | | 7/1999 | Hartung et al. |
| 5,948,092 A | | 9/1999 | Crump et al. |
| 5,973,722 A | | 10/1999 | Waikai et al. |
| 5,983,069 A | | 11/1999 | Cho et al. |
| 5,990,959 A | * | 11/1999 | Case ........................ 348/409 |
| 6,067,451 A | * | 5/2000 | Campana, Jr. et al. ....... 455/412 |
| 6,091,736 A | * | 6/2000 | Hayashi ..................... 370/428 |
| 6,092,080 A | * | 7/2000 | Gustman ..................... 707/103 |
| 6,167,253 A | * | 12/2000 | Farris et al. ................ 455/412 |
| 6,188,887 B1 | * | 2/2001 | Joong et al. ................ 455/417 |
| 6,199,060 B1 | * | 3/2001 | Gustman ....................... 707/3 |

\* cited by examiner

*Primary Examiner*—Edward F. Urban
*Assistant Examiner*—Marceau Milord
(74) *Attorney, Agent, or Firm*—Gardner Carton & Douglas

(57) ABSTRACT

An information distribution system with an architecture that facilitates efficient distribution of a plurality of information asset data to a plurality of different requesting users substantially simultaneously. Fundamental components of the system include a plurality of mass storage devices that store information assets, mass storage device interface units, a switching unit, a centralized control unit and a gateway to the users. Information transfer between various components of the system is accomplished through a plurality of communication channels according to a circuit switching protocol. According to one embodiment of the invention, a plurality of communication channels are provided between the mass storage devices and the switching unit such that information asset data may be transferred, in substantially a single format and according to substantially a single protocol, from the mass storage devices directly through the switch and to the requesting user.

29 Claims, 4 Drawing Sheets

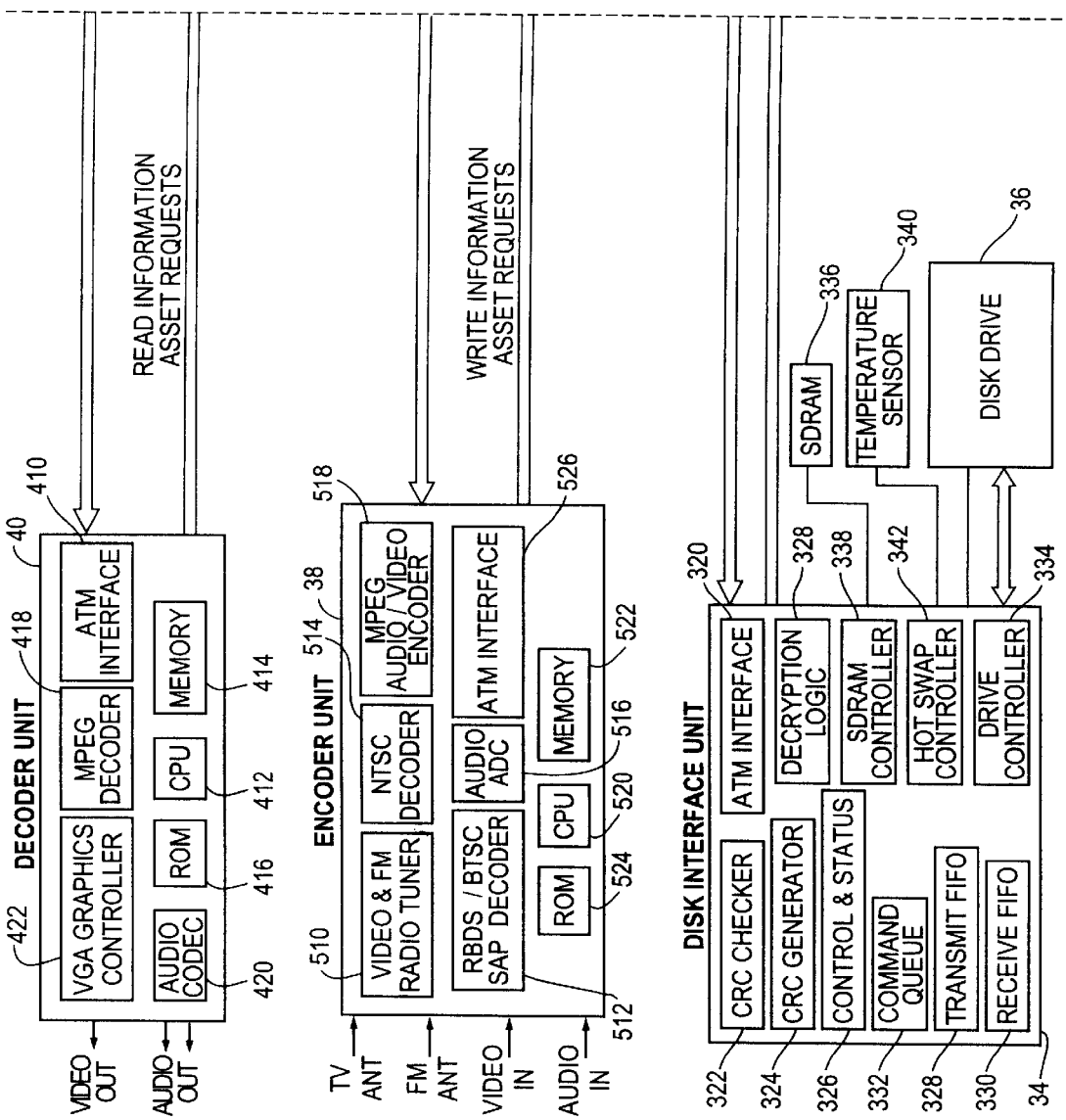

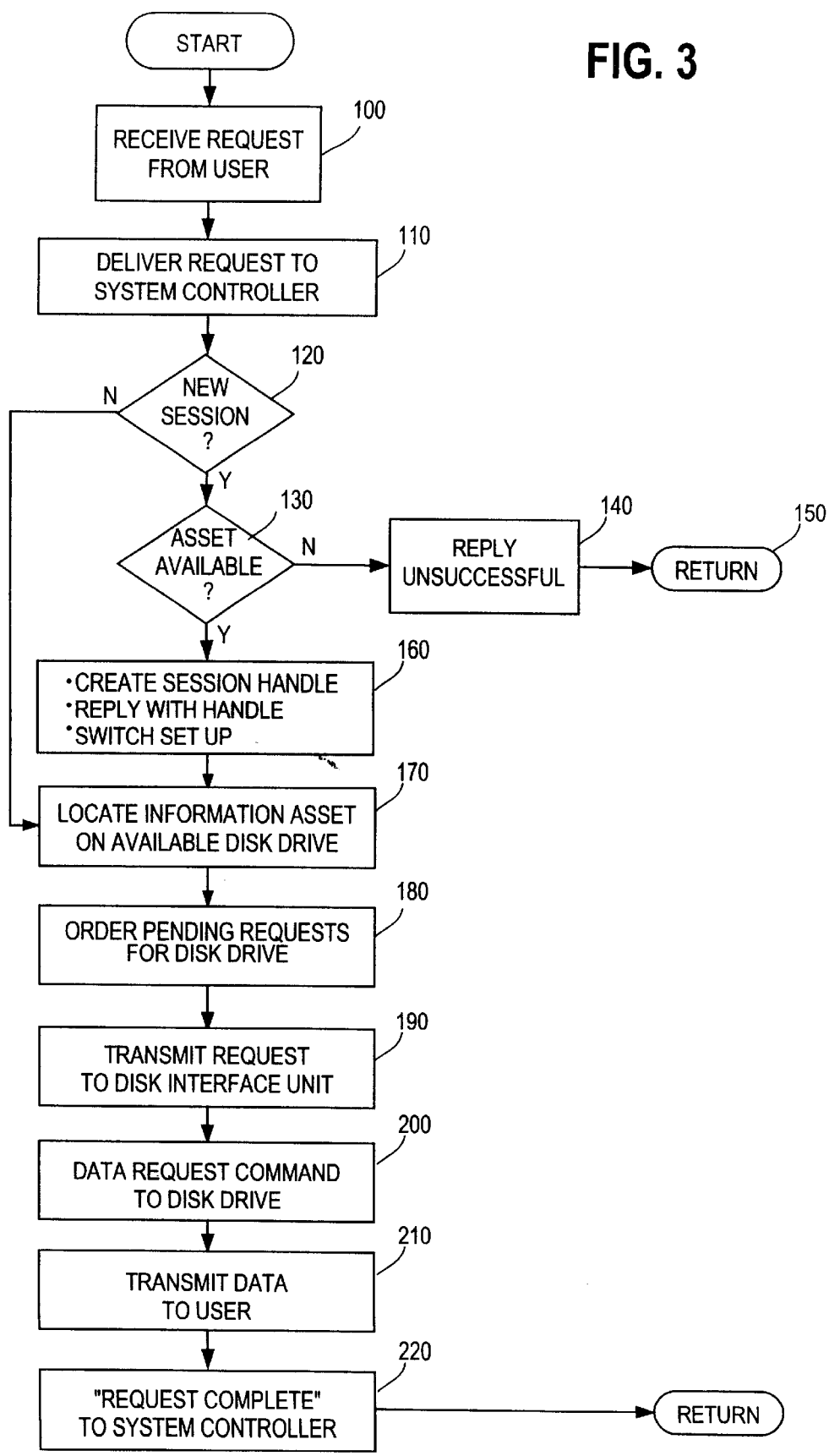

INFORMATION DISTRIBUTION SYSTEM AND METHOD

CROSS-REFERENCE TO RELATED APPLICATIONS

This application claims the benefit of U.S. Provisional Application Serial No. 60/193,729 filed Mar. 30, 2000.

FIELD OF THE INVENTION

The present invention relates generally to an information distribution system and method, and, more particularly, to a system and method for distributing "on demand" a plurality of substantially fixed information assets to a plurality of different users substantially simultaneously.

BACKGROUND OF THE INVENTION

There is a growing need to provide distribution of electronically stored information to a variety of different users simultaneously and "on demand." Traditionally, electronically stored information could be utilized by individuals by obtaining a copy of the information stored on a fixed medium, such as an audiotape, videotape, floppy disk or CD ROM, and viewing or playing the information with an associated device, such as a tape player, VCR, CD player or, once loaded onto a computer system hard drive, the computer system.

With the massive information content presently available and with rapidly growing content development, such a physical distribution system is no longer feasible. Moreover, in particular environments, it is also not desirable. For example, in-room movies at hotels are a source of additional income for the hotel and an expected convenience for hotel guests. Instead of accommodating each room with separate video players and managing the physical distribution of videocassettes, some hotels have established a network whereby a bank of video players may continuously play a predetermined set of videocassettes and several guests may simultaneously view the same video.

This, however, is not a true "on demand" system because guests must join in viewing a video at the particular segment in which it is currently playing. Furthermore, providing a plurality of separate video players—one for each different video selection—is a cumbersome, costly and technologically inefficient system, requiring frequent and costly maintenance as well as substantial human intervention.

Various information distribution systems have been proposed, but such systems are based upon conventional architectural concepts and suffer from limitations that prevent them from effectively delivering a plurality of different information assets substantially simultaneously.

One such prior art system is disclosed in U.S. Pat. No. 5,414,455 to Hooper et al., assigned to Digital Equipment Corporation. As can be seen from FIG. 2, that system is based upon a conventional computer and workstation architecture where shared control and data buses are provided between the various elements of the system. While such an architecture may be beneficial for typical data processing tasks, it does not effectively perform an information-on-demand information distribution function. The shared data and control buses quickly limit and degrade information distribution performance, and moreover, such a system requires complex data buffering schemes.

Another prior art system is disclosed in U.S. Pat. No. 5,625,405 to DuLac et al. While the DuLac patent discloses an architecture that differs from that used in a conventional computer system or workstation, it suffers from similar limitations and deficiencies that will preclude the system from effectively performing as an information-on-demand system. The DuLac et al. system proposes fiber channel cables that deliver video data by computer technology to a conversion unit that converts the video data to ATM telephony technology for transmission to a network. The conventional computer technology associated with the video storage devices will result in a bottleneck that will substantially limit the performance of the system for delivering multiple simultaneous information streams. For example, FIG. 1 teaches using a large number of storage devices, all of which supply data to a multi-port switch through a single data path connection. This arrangement will require complex sharing of a single communication channel among many different storage devices, resulting in a bottleneck and similar problems characteristic of the deficiencies and limitations encountered in bus-based systems.

SUMMARY OF THE INVENTION

The present invention overcomes the deficiencies and limitations of such prior art systems by providing a unique architecture that is particularly beneficial for performing information-on-demand distribution of information assets. One of the advantages of the present invention is realized by the use of a circuit switching technique for the transfer of information between various elements of the system. Since the information transfer technique is substantially consistent throughout the system, complex and burdensome data conversion is not necessary. This feature also facilitates convenient information asset transfer from mass storage devices to requesting users or to other mass storage devices, and also facilitates the system receiving new information assets for storage on mass storage devices.

Another advantage of the present invention is realized by providing a plurality of communication channels to accommodate a transfer of data between a plurality of mass storage devices. Such a plurality of communication channels eliminates the communication channel bottleneck and contention deficiencies of prior art systems.

Another advantage of the present invention is realized by providing a centralized control unit that receives requests from users for various information assets. Such a centralized control feature allows the system to reorder the requests into a sequence that will allow much greater efficiency of reading information asset information from any particular mass storage device. Such a feature is possible because the centralized control unit contains information relating to which mass storage device or devices contain the requested information asset and where that information asset is located on the mass storage device. Additional advantages are also realized through such a centralized control unit, such as allowing the system to monitor information asset usage, mass storage device usage and performance, as well as a great number of other features relating to housekeeping and system maintenance.

Another advantage of the present invention is that, while the information asset requests are centrally managed, the information asset information does not flow through the central control unit. Instead, information asset information is transmitted directly from mass storage devices through a switch and to the appropriate destination—without the need for conversion to a different data format. In other words, the same data transmission format and protocol is used substantially throughout the system to facilitate extremely efficient transfer of a plurality of different information assets at high speed and high volume and substantially simultaneously.

BRIEF DESCRIPTION OF THE DRAWINGS

The foregoing and additional features and advantages of the present invention will be apparent from the following detailed description in conjunction with the drawings, in which:

FIG. 3 is a flow diagram that illustrates the steps that may be performed in connection with the architecture of the present invention to deliver information asset data requested by users.

DETAILED DESCRIPTION OF THE INVENTION

Figure 1:
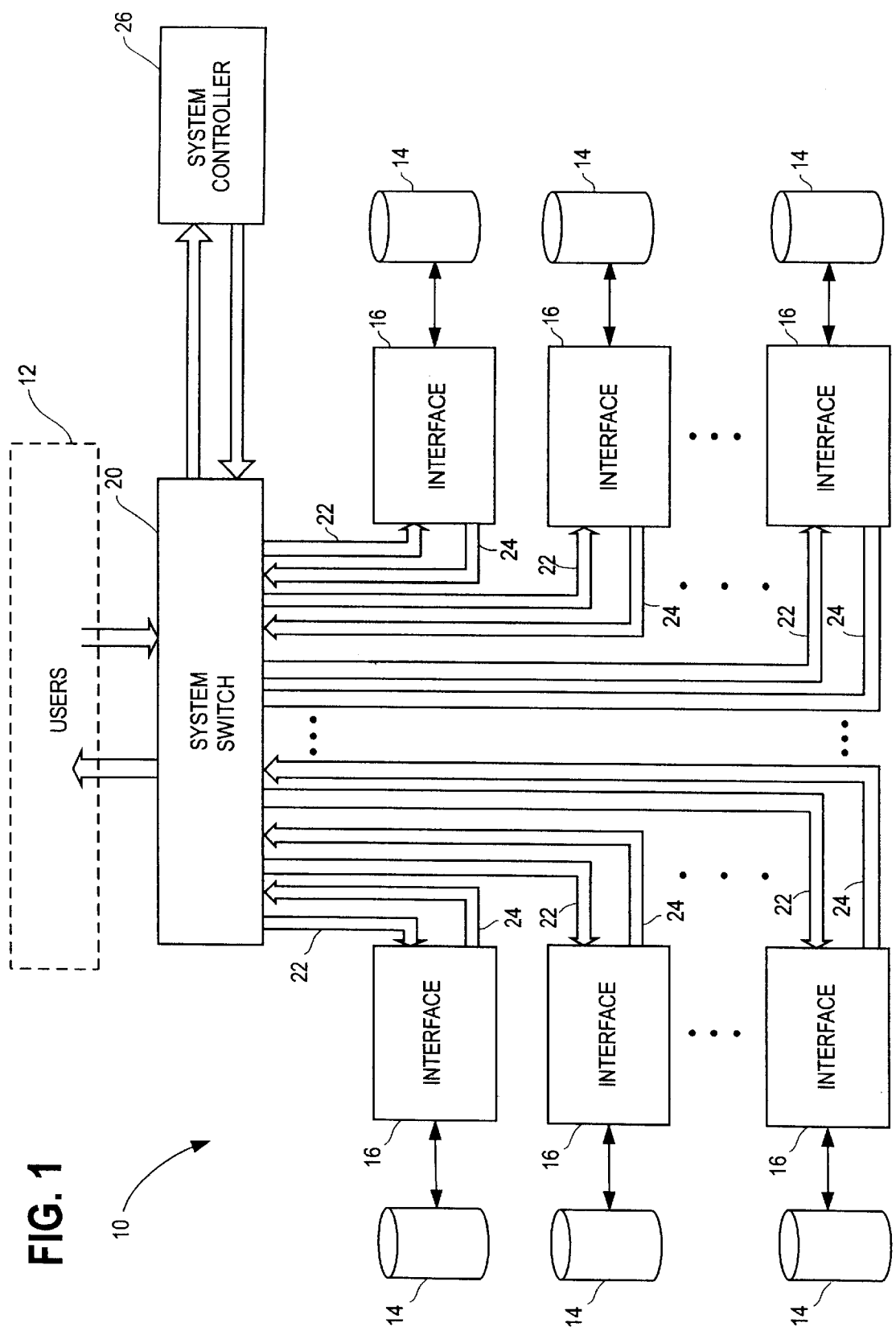
FIG. 1 is a schematic block diagram that illustrates various features of the architecture of the information distribution system of the present invention.

Turning to FIG. 1, there is shown a schematic block diagram that illustrates various basic components and the general arrangement of the architecture of an information distribution system 10 in accordance with one embodiment of the present invention. The information distribution system 10 receives requests for the distribution of particular information assets from any number of various users 12. In response to the requests, the system locates the information assets and distributes the particular information assets to the requesting user(s).

According to an important aspect of the present invention, the system may operate as an "information-on-demand" system where any of the information assets may be distributed to any of the users at any time, even in the case where the same information asset is distributed to a plurality of users simultaneously. It should be understood that, particularly in connection with this latter situation, distribution of a particular information asset to several users simultaneously may require distributing the asset at a particular distribution rate for each user. Further complexity is introduced when, as may typically be the case, the information asset is large in size and multiple users have requested the asset at different times, so distribution of the asset will be proceeding simultaneously but at different points within the asset. One useful example of such a situation is the simultaneous distribution of a plurality of video information assets. Video information assets may be extremely large files which are usually distributed in segments as the information is viewed (or partially buffered) by the user. This is a process that is more commonly known as "streaming" of video information. While some users may have some buffering capability, usually the system will be required to distribute video information in segments, such as blocks of a predetermined size requested by the user, until the entire video asset is distributed or the user issues an instruction to discontinue the distribution.

A great plurality of information assets, such as files containing video, audio, image, text or other data, is stored on a plurality of mass storage devices 14. According to one embodiment of the invention, the mass storage devices 14 may be hard disk drives. Associated with each mass storage device 14 is a mass storage device interface 16 that issues appropriate instructions to the mass storage device 14 to retrieve the information desired. The interface unit 16 of each of the mass storage devices 14 is communicatively connected to a system switch 20 to allow transmission of data and information between the switch and the interface 16. The system switch 20 is also communicatively connected to the users 12 of the system 10. Information and instructions transmitted between the system 10 and the users 12 are sent through the system switch 20. According to the illustrated embodiment of the invention, for each of the interface units 16, there is provided a first transmission line for transmitting information from the switch 20 to the interface unit 16, and a second transmission line for transmitting information from the interface unit 16 to the switch 20. Although it may be possible to implement an information-on-demand system in accordance with the present invention with only a single transmission line between the switch and each interface unit 16 that handles bi-directional transmissions, the illustrated architecture may be preferable because it will allow transmission of information to the users while simultaneously providing the interface unit 16 with additional instructions or information.

Another important element of the fundamental architecture of the illustrated embodiment of the invention is a system controller 26. The system controller 26 is generally responsible for receiving requests from users for information assets, organizing the requests and forwarding them through the switch 20 to appropriate interface units 16 which will retrieve the requested information from the associated mass storage device 14 and transmit the information through the switch 20 and directly to the user or a gateway associated with the user 12. The system controller 26 will also be responsible for various "bookkeeping" duties with the system 10. For example, the system controller 26 may maintain an up-to-date library of information assets available on the mass storage devices 14, may monitor usage statistics of various information assets, may move various information assets between different mass storage devices 14, and perform numerous other administrative functions.

According to an important aspect of the present invention, information which is distributed by the system 10 may be transmitted directly through the switch 20 to the users. In contrast, conventional prior art information distribution systems have been commonly based upon a decades-old computer system architecture having three common bus elements—one for data, one for address information and one for control information. Although such an architecture may be very useful for some applications, it results in tremendous inefficiencies and complexities for an information-on-demand system. For example, since such conventional prior art systems have one common data bus, complicated bus contention protocols must be provided and, moreover, only one mass storage device can be placing information on the data bus at a time. Many other complications, inefficiencies and problems are encountered when attempting to utilize such a conventional architecture to perform an information distribution function. In this regard, the present invention represents a substantial improvement and overcomes deficiencies inherent in prior art systems by providing a plurality of data transmission lines 22, 24, each of which may be independently and simultaneously transmitting information asset data to users. Such an architecture substantially increases the performance, flexibility and capacity of the system to simultaneously deliver multiple streams of information asset data to a plurality of users, i.e., to effectively operate as a genuine information-on-demand system.

Although the invention is illustrated in FIG. 1 such that there is a single mass storage device 14 associated with each interface unit 16, according to an alternative embodiment, the architecture may be modified to accommodate multiple mass storage devices 14 for a single interface unit 16. For example, the amount of information storage for the system may effectively be doubled by provided two disk drives for each disk interface unit. Such an implementation may be readily realized based upon the fundamental architecture illustrated in FIG. 1, particularly if an effective data transmission protocol is utilized, as will be described in greater detail below. Thus, when a request for information is received by a disk interface unit 16, the disk interface unit 16 examines the request to determine which of a plurality of disk drives 14 the request is directed to. In response, the disk interface unit 16 will direct the information request to the appropriate disk drive 14 associated with the disk interface unit 16, receive the requested information from the disk drive 14, and transmit the information through the switch 20 to the requesting source which, in most cases, will be a user.

As will be readily apparent to one of skill in the art, the present invention as illustrated by the example architecture of FIG. 1 represents a substantial improvement over conventional systems because, among other things, it is not limited to the traditional bus-based architecture. Further efficiencies and advantages of the present invention may be realized by utilizing particularly effective data transmission protocols. According to a preferred embodiment of the invention, a messaging or cell-based protocol for transmission of data and information between various elements of the system may be utilized. In this regard, instructions and information may be transmitted through the system in units such as a cell, message or packet that typically will contain, in addition to the data or information, a header that may be used to identify the source as well as the destination for the unit of information. Using such a protocol, a request for an information asset from a user may initially be directed through the switch 20 to the system controller 26, which will determine if the information asset is available and where it resides on the system. Once the system controller 26 determines that the particular information asset exists on the system 10, the system controller 26 may, as appropriate, generate one or more requests to the appropriate interface unit 16.

The requests for an information asset from a user may be handled on a session basis. For example, when an initial request from a user for a new information asset is received by the system controller 26, the system controller 26 may establish a new session, and generate a unique handle to identify the session. When a new session is established, virtual circuits within the system switch 20 may be set up to handle communications for the new session. For example, the system switch 20 may, based upon the circuit identifier, route information for a particular session from the appropriate interface unit 16 to the requesting user 12 via the virtual circuit set up when the session was established. The system controller 26 may set up multiple virtual circuits between the same end points, but each traversing a different path through the system switch 26. When doing so the circuits will be configured so that information arrive at the destination as though it was a single circuit. The system controller 26 may select which circuit to use on a packet by packet basis, ensuring that at most one of the circuits is actually in use for any specific packet. In a similar manner, a virtual circuit within the system switch 20 may be set up to handle communications from the system controller 26 to the interface unit 16 associated with the mass storage device 14 that contains the information asset requested. Typically, these virtual circuits will remain in place for the entire session. However, it is possible that the routing of the virtual circuit, or simply the selection amongst the already provisioned circuits, may be changed in the case of certain events within the system. According to one embodiment, the set of virtual circuits that may be used for a given session will have a collective identifier, or handle. For example, in the event that a mass storage device 14 which is supplying a requested information asset experiences a technical problem, such a fault may be communicated to or sensed by the system controller 26 which, in response, may establish or select a different virtual circuit under the same handle which will allow the same information asset on a different mass storage device 14 to be transmitted to the user through the switch. As may be appreciated, this same approach may be used in the case of other events that might compel the changing of which of the mass storage device 14 that contain a particular information asset are used to deliver that asset to a user. Because of the unique design of the system, such a change in the supplying mass storage device 14 will be transparent to the requesting user.

In general, the present invention may be advantageously implemented with a self-routing switching technique, also sometimes referred to as a self-routing "switching fabric". The term "switching fabric" means, for example, the combination of hardware and software that moves data coming into the system switch out to the correct port or communication channel, which in turn may provide the data to another network. With a self-routing switching fabric, the path a packet or cell takes through the fabric is determined by a circuit identifier in the packet or cell header. The originating port alone is insufficient to determine the routing of the cell or packet.

Further characteristics of a self-routing switching fabric are that all packets or cells sent with the same circuit identifier at a given port will arrive at the same target port. All cells that arrive will arrive in the same order, and cells may be dropped, but not re-ordered. All of these cells will have the same circuit identifier. This may be changed during transit through the fabric, but any such changes will apply to all cells that successfully transit the system. In some cases, this path is referred to as a "virtual circuit". Typically, the circuit must be set up prior to the first cell or packet being transmitted.

Such a self-routing switching fabric differs from setting up an actual circuit, where all packets or cells from a given port will always be delivered to the same destination without need for headers. However, such an actual circuit arrangement would not support use of a single port to interleave output for many destinations over a short period of time.

A self-routing switching fabric also differs from techniques such as Internet Protocol (IP) routing where there is no pre-determined route for each packet. Under such a protocol, the packets are labeled with the desired destination, rather than by the circuit they should follow. At each step, or hop, over the fabric, the router merely makes its best effort to send the packet closer to the packet's final destination. Different packets may take different paths, and hence could arrive out of order. While this form of routing may be preferable for sporadic messages of short duration, it is far less efficient for large transfers and is typically especially inefficient for long streaming operations.

According to a preferred embodiment of the invention, the ATM (asynchronous transfer mode) dedicated-connection switching protocol may be used to transmit information between various components of the system. Other switching technologies may be equally as applicable. The preferred selection of ATM reflects primarily the cost tradeoffs in the design rather than a necessity for a specific switching protocol. Of course, a standard disk drive interface may be used to handle communication between the disk interface unit and the disk drive or drives which are associated with the disk interface unit. According to the ATM protocol, 53-byte cells may be transmitted between various components of the system. As will be explained in greater detail in the following examples, the particular characteristics of the ATM protocol make it very effective for information-on-demand performance, especially when implemented in connection with the unique system architecture of the present invention.

Figure 2B:
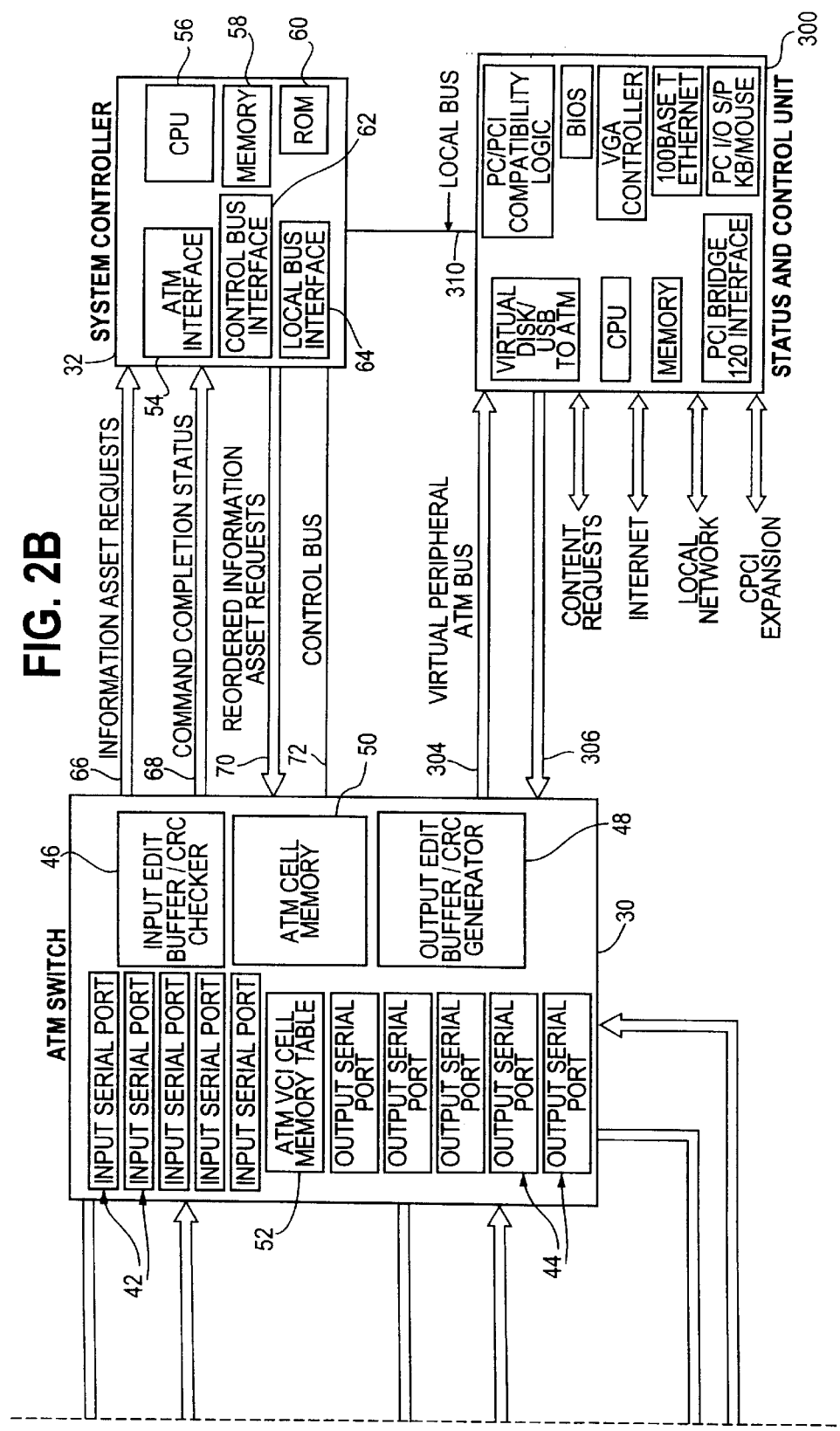
FIG. 2 is a more detailed schematic block diagram of one embodiment of an information distribution system according to the present invention.

Turning now to FIG. 2, there is illustrated a preferred embodiment of the invention that depicts various features of the information-on-demand system in greater detail. For ease of illustration, there is illustrated only one disk interface unit. However, it should be understood that it is contemplated that the system may include many disk interface units and many disk drives that contain information assets. In addition, it is contemplated that each disk interface unit may interface with one or more disk drives.

Illustrated in FIG. 2 are all of the similar components illustrated in FIG. 1, including the system switch 30, system controller 32, disk interface unit 34 and disk drive 36. In addition, the users of FIG. 1 have been depicted, by way of example, as various encoding 38 and decoding 40 units. The system switch 30 is a switch that follows the ATM convention of direct connection switching. The switch 30 has a plurality of different input ports 42 and a plurality of output ports 44. In addition, the switch 30 includes an input CRC (cyclical redundancy check) checker 46 and an output CRC generator 48 for ensuring there are no errors in the data cells transmitted or received in accordance with the ATM protocol. In addition, there is provided an ATM cell memory 50 and an ATM VCI cell memory table 52, which are used by the switch 30 to determine appropriate routing for various cells that are transmitted through the switch 30 according to the ATM protocol.

The system controller 32, as illustrated in the embodiment of FIG. 2, is comprised of several elements including, for example, an ATM interface 54, a CPU 56, memory 58, a ROM 60, a control bus 62 interface and a local bus interface 64. The ATM interface 54 is used to extract the data, control or other information transmitted to the system controller 32 through the switch 30 which originated from another component of the system. In some cases, several ATM cells may be used to transmit command or data information since, generally, the ATM protocol involves cell sizes of only 53 bytes in size. The CPU 56 operates a control program that is initially loaded from the ROM 60 upon system start-up, and uses the memory 58 for processing and storage of local variables and data. For example, the memory 58 may be used by the system to at least temporarily store information relating to information asset requests from users for particular disk drives 36 for the purpose of re-ordering those requests in a manner that the disk drives 36 may efficiently retrieve such information asset data, as will be explained in greater detail. When a series of information asset requests are ordered for a particular disk drive, the information asset requests, which request particular information asset data from a particular disk drive to be delivered to a particular user, are transmitted from the controller 32 through the switch 30 to the appropriate disk interface unit 34 associated with the particular disk drive 36. The memory 58 of the system controller 32 may also store information relating to the library of information assets available on all of the disk drives 36 on the system. Thus, when a new request for an information asset is received by the system controller 32, the system controller 32 operates to locate the information asset in its library of assets. According to an alternative arrangement, however, it is also possible for the system controller 32 to periodically send a "broadcast" transmission to all connected users identifying all the information assets available on the system.

The system controller 32 communicates with the other parts of the system through ATM communication channels to the switch 30. According to the illustrated embodiment, one ATM communication channel 66 may be provided to transmit information asset requests to the system controller 32, one ATM communication channel 68 may be provided to transmit completion status information to the system controller from the various disk drives (which are directed to the system controller from the disk interface units 34 through the switch 30), another ATM communication channel may be provided for the system controller 32 to provide error messages and/or traffic flow control to the end user of the storage devices, and another ATM communication channel 70 may be provided for the system controller 32 to transmit information asset requests to the various disk interface units 34, which requests have preferably been reordered to allow the disk drives 36 to more efficiently retrieve the stored information asset data. In addition to the various ATM communication capabilities, the system controller may also have a control bus connection 72 to the switch to allow for status and control information to be communicated between the system controller and the ATM switch 30. The control bus 72 may be used to set up the virtual connections within the switch 30, and may also be used to initialize the switch 30 upon system start-up.

The system may also include a status and control unit 300, as illustrated in FIG. 2. Such a unit provides a convenient interface where a system operator may check the status of various aspects of the system, examine the contents of the information asset library on the system, check usage statistics, change parameters or settings, generate billing information or perform other maintenance functions. The status and control unit 300 might also allow for a system operator to download a new information asset on the system. The status and control unit may be comprised of several elements, including, for example, conventional computer components such as a CPU, memory, BIOS, VGA controller, and keyboard and mouse to facilitate system operator usage, as well as other additional components such as a virtual disk, PC/PCI compatibility logic, ethernet capabilities, and a PCI bridge interface. The status and control unit may communicate with the system controller via a local bus 310, and may also transmit and receive information from other parts of the system through ATM communication channels 304, 306 with the switch 30, as illustrated. In addition, the status and control unit 310 may allow for interfacing with other systems and devices, such as the Internet, Local Network, Expansion Units and other units to handle various content requests.

The system also includes a plurality of disk interface units 34 which are connected to the switch to transmit and receive information in ATM format. FIG. 2 shows only one disk interface unit merely for ease of illustration. However, it should be understood that many disk interface units 34 could be provided, each of which may communicate with the switch to transmit and receive information in ATM format. In addition, FIG. 2 illustrates only one hard disk 36 associated with the disk interface unit 34. However, it is possible that each disk interface unit may interface with multiple disk drives with relatively minor modifications to the elements of the disk interface unit 34, such as providing additional transmit and receive buffers and drive controllers. The disk interface units 34 serve an important function to interface between the disk drives 36 and ATM protocol communications with the switch 30.

The disk drive interface units 34 may be provided with an ATM interface 320 to encode and decode information in ATM cell format, as well as a CRC checker 322 and a CRC generator 324 for, respectively, performing CRC checks of ATM cells transmitted to the disk interface unit 34 and generating a CRC check code for ATM cells transmitted by the disk interface unit 34. The disk interface units 34 may also include control and status capabilities 326 for monitoring and handling the disk interface unit 34. In addition, the disk interface units may be provided with encryption/decryption logic functionality 328 to protect proprietary information asset data that may be stored on the associated hard disk drives 36. A transmit FIFO buffer 328 may be provided to temporarily store information asset data that has been retrieved from the disk drive 36 and is to be formatted into ATM cells to be transmitted from the disk interface unit 34.

Similarly, a receive FIFO buffer 330 may be provided to temporarily store data received by the disk interface unit 34 and is to be written to the disk drive 36. A command queue 332 is provided to temporarily store disk drive commands that are to be issued to the disk drive 36 by the drive controller 334. SDRAM memory 336 and an SDRAM controller 338 may also be provided to receive information asset data which may be very rapidly supplied from the disk drive in response to a command to retrieve data. By providing the SDRAM memory 336 to handle extremely fast data reads from the disk drive 36, the system performance may be enhanced and disk latency virtually eliminated. A temperature sensor 340 may also be provided and may be electrically connected to the disk interface unit 34 to notify the disk interface unit 34 in the event a disk drive 36 is overheating. In such an event, the disk interface unit 34 may notify the system controller 32 of the situation and the system controller 32 may initiate a routine to have all or some of the information on the overheating disk drive copied to other disk drives, and the overheating disk drive may be deactivated to prevent damage to the system. The disk interface unit 34 may also be provided with a hot swap controller 342 to control power up and power down of the disk drive 36.

According to an advantageous aspect of the present invention, as may be appreciated, the disk interface unit 34 may be fabricated in a low-cost and high volume manner in an ASIC chip. When the features of the disk interface unit 34 are provided in an ASIC chip, the overall size of the information distribution system may be significantly reduced. In addition, other benefits may also be realized through such an implementation, such as lower power consumption, greater reliability and durability, lighter weight and simpler and faster mass fabrication.

Also illustrated in FIG. 2 are decoder 40 and encoder 38 units that may transmit information between the switch 30 in ATM format. Since the information stored on the disk drives 36 is stored in digital format, the encoder and decoder units may perform various conversion tasks. A plurality of decoder units and encoder units may be provided, each of which may transmit and receive information in ATM cell format with the switch 30. The decoder unit 40 may be provided with an ATM interface 410 to convert information from ATM cell format that is received from the switch 30 and to convert information to ATM cell format that is to be transmitted to the switch 30. The decoder units 40 will typically be provided with some conventional processing elements such as a CPU 412 and memory 414 and ROM 416, as well as several elements such as an MPEG decoder 422, and audio codec (coder/decoder) 420 and a VGA graphics controller 422 for converting information asset data stored on the disk drives 36 to a different format that is desired by the users. For example, digital video information may be stored on the disk drives of the system in a compressed digitized format such as MPEG II; and an MPEG II decoder may be provided in the decoder unit to uncompress and convert the video information into a different format for transmission to the user. Digital audio information may be similarly converted by an audio codec. As illustrated, the decoder unit 40 may transmit information to users, such as video information or audio information or, according to alternative embodiments, in any other conventional formats desired by the users.

Similar to the decoder unit 40, the encoder unit 38 performs a variety of conversion functions. Illustrated by way of example, a variety of different input sources may be input to the encoder unit, such as conventional analog television or FM signals from an antenna, or video or audio signals. The encoder unit may be provided with a similar variety of converting elements, such as a video and FM radio tuner 510, an RBDS/BTSC SAP decoder 512, an NTSC decoder 514, an audio ADC decoder 516 as well as an MPEG encoder 518. In addition, each of the encoder units will typically also be provided with some conventional processing elements, such as a CPU 520, memory 522 and ROM 524, as illustrated. The information distribution system may be provided with a plurality of encoder units, each of which may transmit and receive information with the switch 30 via an ATM interface 526.

It is useful to understand certain disk drive characteristics in order to appreciate some of the advantages of the present invention. First, disk drives are devices that can only perform one operation at a time. Further, the operation is performed at a specific location within the disk drive. Second, while the device is random access, meaning that any operation can be performed at any location in any order, there is usually a significant time penalty associated with moving to the desired location of the drive. The time required to move the read/write head to the desired location, referred to as the "seek time," typically consumes more of the device's time than the actual data transfers. Third, one the data transfer begins, it is typically at a burst rate far in excess of the sustained rate of the matching source or destination. The ability of the disk drive to burst transfer at rates far greater than that of the matching source/destination allows multiple source/destinations to be supported concurrently from a single drive. An important aspect of the invention is to reduce the amount of time devoted to seeks, as opposed to actual data transfers, while still meeting the demands of multiple concurrent source/destinations. While the present invention is described in connection with the characteristics of computer disk drives, the techniques disclosed may be applicable to a much wider variety of storage media with similar characteristics.

According to an important aspect of the present invention, information asset requests from a disk drive may be advantageously re-ordered to more efficiently retrieve the requested data in view of the physical and operational design characteristics of the disk drive. Although the invention may utilize virtually any mass storage device to store information assets, due to cost and speed considerations, hard disk drives are currently preferred for storing information asset data. Hard disk drives are typically formatted into different sectors and include a read/write head that travels close to the surface of a disk that is rotating at high speed. The read/write head typically moves perpendicular to the rotation and senses changes in the electrical or electromagnetic characteristics of the disk drive medium to read data from the drive. Large files of data are preferably stored on physically contiguous or adjacent areas of the disk drive on so that the read head can more efficiently retrieve the data from a file.

However, in an information-on-demand system, there may be portions of several different information assets that are simultaneously requested by different users, as well as different portions of the same information asset requested simultaneously by different users. Under such circumstances, assuming the requests are directed to information asset data on one of the disk drives, the requests to retrieve information asset data may be received by the system in an order which would result in the read head inefficiently traversing large expanses of the drive area to get to the next request area, even though there may be a pending read request relating to an area over which the read head is skipping merely because it is unaware of the pending read request. Thus, according to a preferred embodiment of the invention, the system controller will re-order pending requests for information asset data from a disk drive, based upon information regarding the information assets from the library of information assets accessible to the system controller. In order to facilitate such a re-ordering technique, the library of information assets should include information regarding not only which disk drive contains the information asset but also information regarding the location where the information assets are located on the disk drive. With this information, the system controller may advantageously re-order information asset requests to allow for a much more efficient retrieval of data. In addition to substantially enhancing the data retrieval process, such a re-ordering technique may prolong the life of the disk drives.

Turning now to FIG. 3, there is shown a flow diagram that illustrates, by way of example, the steps that may be performed in connection with the architecture of the present invention to deliver information asset data requested by users. Starting with step 100, the system receives a request for information asset data from a user. According to a preferred embodiment of the invention, this will be received at the switch in an ATM cell format. Based upon the header information of the cell, in the next step, step 110, the switch will route the request to the system controller. Next, in step 120, the system controller examines the request to determine if it relates to a pre-existing information request session for that user. This may be accomplished by the system controller examining "handle" information contained with the request or other identifying information indicating that the request is related to a previous request or series of requests where a switch circuit is established to handle the communication from the disk drive through the appropriate disk interface unit and to the user.

If, in step 120, it is determined that the request relates to a new session, the routine continues to step 130 where the system controller examines the library of various information assets available on the system to determine if the requested asset exists and if available. In some cases, even if the requested asset exists on the system, it may not be available if, for example, the present usage characteristics of the particular disk drive upon which it resides might not successfully allow another user to access the information. In another case, the information asset might also not be available to that particular user because the user does not have sufficient authorization to receive such an information asset. If, in step 130, the information asset requested does not exist or is not available, the routine continues to step 140 where the system controller replies to the user that the system was unsuccessful in delivering the information asset requested, and the routine returns in step 150.

Otherwise, in step 130, if the information asset exists and is available, the routine continues to step 160 where a new session is established and a session handle is created, a reply is transmitted to the user with the session handle, and an appropriate virtual circuit is set up in the switch to handle the session. Next, in step 170, which may be entered after a new session is established in step 160 or if a request is recognized as relating to a pre-existing session in step 120, the system controller locates the requested information asset on an available disk drive. This will typically involve the system controller examining its library of information asset data to determine which disk drive contains the information asset, which disk interface unit is associated with the disk drive and where on the disk drive the information asset is located. In some cases, the requested information asset may be available on more than one disk drive. In such a case, the system controller will determine which of the disk drives would be most appropriate to deliver the information asset. Factors that may be considered are, for example, the number of users presently accessing information assets on a disk drive, and the historical usage characteristics of the disk drives.

Once a disk drive is selected in step 170 and the information asset is located on that drive, the routine continues to step 180 where the system controller examines the pending requests for the disk drive selected. Although many different implementations are possible within the architecture of the present invention, for many applications it may be preferable for each disk interface unit to include a small buffer to store pending disk drive requests, while additional and newer requests may be stored in a buffer in the system controller. Thus, when a "request complete" is received from a disk interface unit for one of its disk drives by the system controller (step 220) the system controller may transmit one or more additional requests to the disk interface unit associated with that disk drive. According to such a technique, the system controller, in step 180, may efficiently re-order pending requests for the disk drives to enhance the retrieval performance of the system, as previously described.

Next, in step 190, at an appropriate time, the request for information asset data is transmitted to the disk interface unit associated with the disk drive. Then, in step 200, the disk interface unit transmits an appropriate command to the disk drive to retrieve the desired information asset data. In step 210, the disk interface unit transmits the information asset data to the user through the switch. According to a preferred embodiment, this may be accomplished by the disk interface unit transmitting one or more cells in accordance with the ATM protocol, which are transmitted directly to the user through the switch. Once the disk interface unit has completed the transmission of the information asset data in step 210, the disk interface unit transmits a "request complete" message to the system controller to indicate that the information asset request has been completed, and the routine returns in step 230.

According to some implementations, the system controller may transmit multiple information asset retrieval requests to a disk drive in response to a single information asset request received from a user. For example, a user might request 32 Kb of information asset data. However, it may be preferable for the system to process such a request into several smaller sized units, such as 4 separate 8 Kb requests. In such a case, the system controller may generate 4 separate information asset read requests to the appropriate disk interface unit which may result in 4 separate 8 Kb read requests to the disk drive. In fact, at the disk interface unit level, the read request might be even further subdivided into smaller read requests that may be of a size that is particularly efficiently retrieved by the disk drive. In either case, the requested information asset data is transmitted to the user.

What is claimed is:

1. An information distribution system for distributing a plurality of information assets to a plurality of users, said system comprising:
   a switching fabric, with a plurality of communication channel connection points, which is capable of establishing a virtual connection between one of said channel connection points and another of said channel connection points,
   a plurality of communication channels connected between a plurality of channel connection points of said switching fabric and an information asset transmission node associated with one or more of said users,
   a plurality of mass storage devices upon which is stored at least one information asset, each said mass storage device having an associated mass storage interface unit, at least one of said mass storage devices having a transmit communication channel connected to a communication channel connection point of said switching fabric and a receive communication channel connected to another communication channel connection point of said switching fabric,
   a control unit comprising:
      memory containing information relating to the information assets stored on said mass storage devices,
      processing means for:
         receiving at least one request for an information asset from at least one of said users,
         determining the availability of said requested information asset and designating one of said mass storage devices as a source mass storage device upon which said information asset is stored,
         supplying control signals to said switching fabric to establish a virtual connection between the connection point associated with said source mass storage device and the connection point associated with said user requesting said requested information asset.

2. A system as claimed in claim 1 wherein said switching fabric is a self-routing switching fabric.

3. A system as claimed in claim 1 wherein where said processing means of said control unit determines a plurality of potential source mass storage devices upon which said requested information asset is stored.

4. A system as claimed in claim 3 wherein said control unit selects one of said plurality of potential source mass storage devices as a source mass storage device based upon predetermined criteria.

5. A system as claimed in claim 1 wherein said control unit is capable of dynamically changing the source mass storage device to another mass storage device that contains the same requested information asset.

6. A system as claimed in claim 1 wherein the data transmission format between said mass storage interface unit, through said switching fabric and to said information asset transmission node is the same format.

7. A system as claimed in claim 1 wherein said switching fabric has a data transmission format that is the asynchronous transfer mode (ATM) format.

8. A system as claimed in claim 1 wherein said processing means of said control unit further comprises means for generating a sequence of data retrieval commands and transmit said information asset data retrieval commands through said switching fabric to the mass storage interface unit associated with said source mass storage device.

9. A system as claimed in claim 2 wherein said sequence of data retrieval commands further includes information sufficient for said mass storage interface unit to transmit said information asset data from said source mass storage device through said switching fabric and to said information asset node.

10. A system as claimed in claim 9 wherein the data transmission format between said mass storage interface unit, through said switching fabric and to said information asset transmission node is the same format.

11. A system as claimed in claim 9 wherein the data transmission format is the asynchronous transfer mode (ATM) format.

12. A system as claimed in claim 1 wherein said mass storage devices are mass storage devices selected from the group comprising a hard disk drive, a CD-ROM, DVD-ROM, or other random access mass storage device having a not insubstantial seek time.

13. A system as claimed in claim 1 wherein at least one of said mass storage interface units is associated with a plurality of mass storage devices.

14. A system as claimed in claim 1 further comprising a status and control unit that is interfaced with said control unit and said switching fabric.

15. A system as claimed in claim 14 wherein said status and control unit is interfaced with at least one external system selected from the group comprising the Internet and a local area network.

16. A system as claimed in claim 1 wherein information assets comprise data selected from the group comprising text, audio, video, image and multimedia data.

17. A method for distributing a plurality of information assets stored on a plurality of mass storage devices to at least one user requesting at least one of said information assets, said method comprising the steps of:
   receiving the request for the requested information asset,
   determining at least one of said mass storage devices upon which said requested information asset is stored,
   establishing a virtual connection between an interface unit associated with said mass storage device and the user,
   transmitting data relating to said information asset through said virtual connection to said requesting user, wherein the same data format is used for transmission throughout the virtual connection.

18. The method according to claim 17 wherein said switching fabric is a self-routing switching fabric.

19. The method according to claim 17 wherein the requested information asset is stored on a plurality of mass storage devices and said step of determining a mass storage device is performed by selecting one of said plurality of mass storage devices based upon predetermined criteria.

20. The method according to claim 19 wherein said predetermined criteria is based upon resource usage characteristics.

21. The method according to claim 19 wherein said selected mass storage device is dynamically changed during distribution of said requested information asset.

22. The method according to claim 17 wherein said step of transmitting comprises the transmission of a plurality of data packets containing data relating to said requested information asset.

23. The method according to claim 17 wherein said virtual connection is an asynchronous transfer mode (ATM) virtual connection that is established through an ATM switching fabric.

24. The method according to claim 17 wherein a plurality of requests for information assets are received and processed through a control unit that contains information relating to the identification and location of information assets stored on said mass storage devices.

25. The method according to claim 24 wherein said control unit generates a plurality of data retrieval requests for one of said mass storage devices.

26. The method according to claim 25 wherein said control unit orders said plurality of data retrieval requests in correspondence with the data retrieval characteristics and the location of information asset data on said one of said mass storage devices.

27. The method according to claim 17 wherein said step of determining one of said mass storage devices includes selecting one of several mass storage devices which contain said requested information asset.

28. The method according to claim 27 wherein said the criteria upon which one of said several mass storage devices is selected is based upon predetermined usage information of said several mass storage devices.

29. The method according to claim 17 wherein said information assets include data selected from the group comprising text, audio, video, image and multimedia data.

* * * * *